US011738730B2

(12) United States Patent
Mellings et al.

(10) Patent No.: US 11,738,730 B2
(45) Date of Patent: Aug. 29, 2023

(54) VEHICLE BRAKING SYSTEM

(71) Applicant: Haldex Brake Products AB, Landskrona (SE)

(72) Inventors: Carl Mellings, Lindley (GB); Dudley Harrison, Lindley (GB)

(73) Assignee: Haldex Brake Products AB, Landskrona (SE)

( * ) Notice: Subject to any disclaimer, the term of this patent is extended or adjusted under 35 U.S.C. 154(b) by 325 days.

(21) Appl. No.: 17/259,628

(22) PCT Filed: Jul. 3, 2019

(86) PCT No.: PCT/EP2019/067884
§ 371 (c)(1),
(2) Date: Jan. 12, 2021

(87) PCT Pub. No.: WO2020/016013
PCT Pub. Date: Jan. 23, 2020

(65) Prior Publication Data
US 2021/0331657 A1 Oct. 28, 2021

(30) Foreign Application Priority Data
Jul. 20, 2018 (GB) ..................................... 1811936

(51) Int. Cl.
*B60T 13/68* (2006.01)
*B60T 8/17* (2006.01)
(Continued)

(52) U.S. Cl.
CPC .......... *B60T 13/683* (2013.01); *B60T 8/1708* (2013.01); *B60T 8/94* (2013.01); *B60T 13/58* (2013.01);
(Continued)

(58) Field of Classification Search
CPC .... B60T 13/683; B60T 8/1708; B60T 17/221; B60T 17/04; B60T 8/94; B60T 15/027;
(Continued)

(56) References Cited

U.S. PATENT DOCUMENTS 9,290,166 B2 * 3/2016 Harrison ................. B60T 8/323
2010/0071779 A1 3/2010 Bordács
2017/0313291 A1 11/2017 Howell et al.

FOREIGN PATENT DOCUMENTS

CN 106864441 6/2017
DE 102006041010 3/2008
(Continued)

OTHER PUBLICATIONS

European Patent No. EP 3421309 to Ittlinger et al published Jan. 2, 2019.*
(Continued)

*Primary Examiner* — Pamela Rodriguez
(74) *Attorney, Agent, or Firm* — Boyle Fredrickson S.C.

(57) ABSTRACT

An electro-pneumatic vehicle braking system including a control line, a modulator valve for controlling the supply of pressurised fluid to at least one brake actuator, a primary valve assembly and a secondary valve assembly, the primary valve assembly and the secondary valve assembly each being fluidly communicable with a source of pressurised fluid, and each of the primary and secondary valve assemblies being fluidly communicable with a control valve assembly, the control valve assembly being configurable in a first configuration to enable fluid communication between the primary valve assembly and the modulator valve, to provide a pneumatic control signal to the modulator valve, in a second configuration to enable fluid communication between the secondary valve assembly and the modulator valve, to provide a pneumatic control signal to the modulator valve, and in a third configuration in which fluid commu-
(Continued)

nication between either of the primary and secondary valve assemblies and the modulator valve is prevented and fluid communication between the control line and the modulator valve is enabled, to provide a pneumatic control signal to the modulator valve.

11 Claims, 1 Drawing Sheet

(51) Int. Cl.
  *B60T 8/94* (2006.01)
  *B60T 13/58* (2006.01)
  *B60T 15/02* (2006.01)
  *B60T 17/22* (2006.01)
  *B60T 17/04* (2006.01)

(52) U.S. Cl.
  CPC .......... *B60T 15/027* (2013.01); *B60T 17/221* (2013.01); *B60T 17/04* (2013.01); *B60T 2270/402* (2013.01); *B60T 2270/403* (2013.01); *B60T 2270/88* (2013.01)

(58) Field of Classification Search
  CPC ............... B60T 2270/402; B60T 13/58; B60T 2270/88; B60T 2270/403
  See application file for complete search history.

(56) References Cited

FOREIGN PATENT DOCUMENTS

| | | |
|---|---|---|
| DE | 102007013671 | 9/2008 |
| DE | 102012025400 | 6/2014 |
| EP | 1847432 | 10/2007 |
| EP | 2913236 | 9/2015 |
| WO | 2018/007799 | 1/2018 |

OTHER PUBLICATIONS

WO document No. WO 2020/239350 to Harrison published Dec. 3, 2020.*
GB1811936.2, Search Report dated Jan. 18, 2019, 3 pages.

* cited by examiner

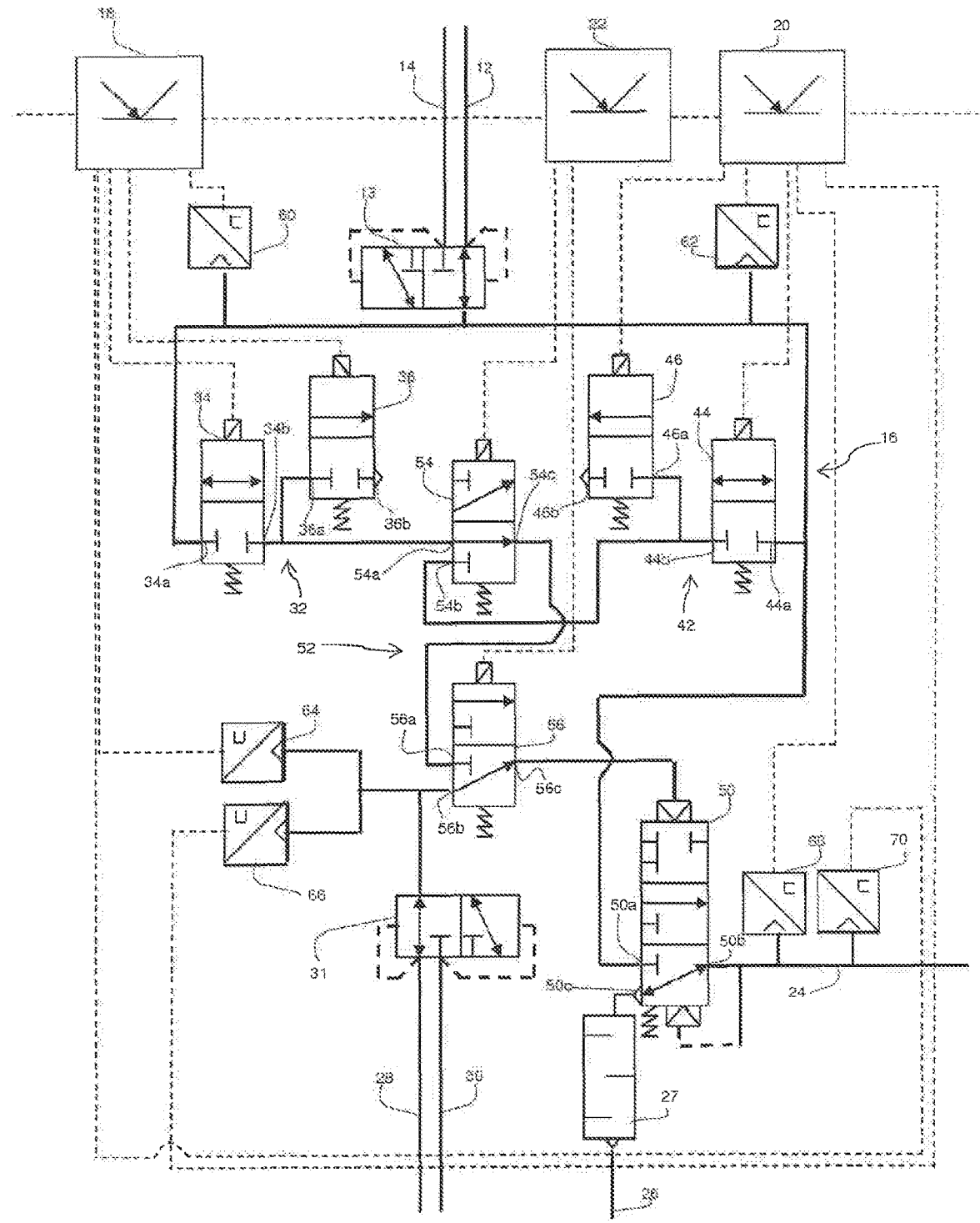

VEHICLE BRAKING SYSTEM

DESCRIPTION OF INVENTION

The present invention relates to a vehicle braking system, in particular, but not limited to a braking system for a truck-trailer combination.

It is known to provide electro-pneumatic vehicle braking systems, which include an electronic control unit for providing electrical signals, for example to indicate a braking demand, to control pneumatic components of the braking system. It is important for vehicle braking systems to comply with all relevant safety standards. It is known to provide redundancy of pneumatic components of a braking system, for example providing a redundant valve, for use in the event of failure of the corresponding valve. A problem exists for an electro-pneumatic system if there is loss of electrical power and/or communications.

SUMMARY

An aim of the present invention is to provide improvements in a vehicle braking system which includes failsafe capability.

There is provided an electro-pneumatic vehicle braking system including a control line, a modulator valve for controlling the supply of pressurised fluid to at least one brake actuator, a primary valve assembly and a secondary valve assembly, the primary valve assembly and the secondary valve assembly each being fluidly communicable with a source of pressurised fluid, and each of the primary and secondary valve assemblies being fluidly communicable with a control valve assembly, the control valve assembly being configurable in a first configuration to enable fluid communication between the primary valve assembly and the modulator valve, to provide a pneumatic control signal to the modulator valve, in a second configuration to enable fluid communication between the secondary valve assembly and the modulator valve, to provide a pneumatic control signal to the modulator valve, and in a third configuration in which fluid communication between either of the primary and secondary valve assemblies and the modulator valve is prevented and fluid communication between the control line and the modulator valve is enabled, to provide a pneumatic control signal to the modulator valve.

The primary valve assembly may have an associated first electronic control unit and the secondary valve assembly may have an associated second electronic control unit.

The electro-pneumatic vehicle braking system may include a third electronic control unit.

The third electronic control unit may be operable to control valve assembly.

The electro-pneumatic vehicle braking system may include a first supply line and a second supply line, each of which may be separately fluidly communicable with the source of pressurised fluid.

The electro-pneumatic vehicle braking system may include a first control line and a second control line, each of which may be separately fluidly communicable with the control valve assembly.

The electro-pneumatic vehicle braking system may include a first transducer and a second transducer, each of which may be operable to monitor pressure in a fluid flow path between the source of pressurised fluid and a respective one of the primary valve assembly and the secondary valve assembly, wherein the first transducer may be electronically communicable with the first electronic control unit and the second transducer may be electronically communicable with the second electronic control unit.

The electro-pneumatic vehicle braking system may include a pair of transducers which may be operable to monitor pressure in a fluid flow path between the control line and the control valve assembly, wherein one of the pair of transducers may be electronically communicable with the first electronic control unit and the other of the pair of transducers may be electronically communicable with the second electronic control unit.

The electro-pneumatic vehicle braking system may include a pair of delivery transducers, each of which may be operable to monitor pressure in a delivery line between the modulator valve and the or each brake actuator, one of the pair of delivery transducers may be electronically communicable with the first electronic control unit and the other of the delivery transducers may be electronically communicable with the second electronic control unit.

A failure of either of the primary valve assembly or the secondary valve assembly may enable operation of the other of the primary valve assembly or the secondary valve assembly.

In the event of a total electronic failure, the control valve assembly may be configurable to provide pneumatic control of the braking assembly, including the modulator valve, by placing the control valve assembly in the third configuration.

BRIEF DESCRIPTION OF THE DRAWINGS

The invention will now be described, by way of example only, with reference to the accompanying drawings, of which:

FIG. 1 is a circuit diagram of a part of a braking system in accordance with the invention.

DETAILED DESCRIPTION

Referring to FIG. 1, there is shown a part of a vehicle braking system 10. The vehicle braking assembly 10 includes a first supply line 12, which supplies pressurised fluid from one or more sources of pressurised fluid, e.g. a reservoir (not shown), to a control valve assembly 16. The flow of fluid from the supply line 12 may be controlled by a first Electronic Control Unit (ECU) 18, a second ECU 20 and a third ECU 22, each of which is operable to provide control signals to one or more valves of a valve assembly 16, and to communicate with one or both of the other ECUs. The dotted lines in FIG. 1 indicate electrical signal pathways. The configuration of the valve assembly 16 controls the flow of fluid from the or each source of pressurised fluid and/or a first control line 28, to a valve 50 which, controls the flow of pressurised fluid to a delivery line 24, which may be in fluid communication with one or more brake actuators (not shown), and an exhaust 26, which enables pressurised fluid to be vented to atmosphere or a low pressure region.

The valve 50 may be operable as a modulator valve, so as to distribute pressurised fluid as required, dependent upon driver braking demand and/or other conditions, and will hereinafter be referred to as a modulator valve. The modulator valve 50 may be a three position, three port relay valve of the kind known in the art. The modulator valve 50 includes an inlet port 50a, which may be fluidly communicable with the source of pressurised fluid, a delivery port 50b which may be fluidly communicable with a brake actuator (not shown) via the delivery line 24, and an exhaust port 50c. The exhaust port 50c may be fluidly communicable with the exhaust 26 via an exhaust flow path which may include a muffler 27. Fluid communication between the source of pressurised fluid and the modulator valve 50 may be direct (which includes via a shuttle valve). The modulator valve 50 is a fluid actuated valve, and the flow of fluid to actuate the modulator valve 50 is controlled by the valve assembly 16.

The vehicle braking system 10 has redundancy and fail-safe features.

In addition to the first supply line 12, there is a second supply line 14 which is fluidly communicable with a source of pressurised fluid (not shown). The source of pressurised fluid to which the second supply line 14 is provided may be the same as that to which the first supply line 12 is connected, or may be a separate source of pressurised fluid. A shuttle valve 13 is provided to switch between the first and second supply lines 12, 14, such that pressurised fluid is available to the valve assembly 16, even in the event of a failure in one of the supply lines 12, 14.

In addition to the first control line 28, there is a second control line 30, and a second shuttle valve 31 which is operable to switch between the first and second control lines 28, 30. This provides redundancy in the event of a failure in one of the control lines 28, 30.

The vehicle braking system 10 also includes a plurality of transducers, each of which is electronically communicable with at least one of the ECUs 18, 20, 22, to provide an indication of the pressure in a respective fluid flow line, and/or the status of a part of the vehicle braking system 10 with which the transducer is associated.

The valve assembly 16 includes a primary valve assembly 32 and a secondary valve assembly 42. The primary valve assembly 32 includes a primary build valve 34 and a primary dump valve 36 which are fluidly communicable with one another. The secondary assembly 42 includes a secondary build valve 44 and a secondary dump valve 46 which are fluidly communicable with one another. Each of the primary and secondary build valves 34, 44 and the primary and secondary dump valves 36, 46 may be two position, two port valves. The primary build valve 34 may have an inlet 34a and an outlet 34b. The primary dump valve 36 may have an inlet 36a and an outlet 36b. The secondary build valve 44 may have an inlet 44a and outlet 44b. The secondary dump valve 46 may have an inlet 46a and an outlet 46b.

Each of the primary and secondary build valves 34, 44 and the primary and secondary dump valves 36, 46 may be solenoid operated. A first transducer 60 is associated with a fluid flow path between the source of pressurised fluid (e.g. the supply line 12, 14) and the primary valve assembly 32, and its purpose is to monitor pressure in that fluid flow path, for example to determine whether the primary valve assembly 32 is being supplied with pressurised fluid. The first ECU 18 may be operable to communicate with each of the primary build valve 34 and the primary dump valve 36. The first ECU 18 may also be operable to communicate with the first transducer 60.

A second transducer 62 is associated with a fluid flow path between the source of pressurised fluid (e.g. the supply line 12, 14) and the secondary control assembly 42, and its purpose is to monitor the pressure in that fluid flow path, for example to determine whether the secondary valve assembly 42 is being supplied with pressurised fluid. The second ECU 20 may be operable to communicate with each of the secondary build valve 44 and the secondary dump valve 46. The second ECU 20 may also be operable to communicate with the second transducer 62.

Each of the primary and secondary build valves 34, 44 is fluidly communicable with a source of pressurised fluid via the first shuttle valve 13 and the supply lines 12, 14. It will be appreciated that in a configuration where a single supply line is provided, there may be no shuttle valve 13, and each of the build valves 34, 44 may effectively be connected directly to the source of pressurised fluid via the single supply line.

The vehicle braking system also includes a control valve assembly 52. The control valve assembly 52 includes a first control valve 54, and a second control valve 56. In embodiments, the first and second control valves 54, 56 may be two position, three port valves. The first control valve 54 may have a first inlet 54a, which may be fluidly communicable with the outlet 34b of the primary build valve 34, a second inlet 54b, which may be fluidly communicable with the outlet 44b of the second build valve 44 and an outlet 54c which may be fluidly communicable with a first inlet 56a of the second control valve 56. The second control valve 56 may also have a second inlet 56b which is fluidly communicable with the or each control line 28, 30, and an outlet 56c which is fluidly communicable with the modulator valve 50, so as to actuate the modulator valve 50. The first and second control valves 54, 56 are fluidly communicable with one another. Each of the first and second control valves 54, 56 is electronically communicable with the third ECU 22.

The first control valve 54 may be fluidly communicable with each of the primary and secondary build valves 34, 44. The second control valve 56 may be fluidly communicable with the modulator valve 50, to provide actuation of the modulator valve 50, for example when the second control valve 56 is open. The second control valve 56 may also be fluidly communicable with the first and/or second control lines 28, 30, for example via the second shuttle valve 31.

A third transducer 64 and a fourth transducer 66 may be provided, each of which is operable to monitor fluid pressure in a fluid flow path between the second control valve 54, 56 and the or each control line 28, 30, for example to monitor whether fluid is flowing between the or each control line 28, 30 and the second control valve 56. The third transducer 64 is electronically communicable with the first ECU 18 and the fourth transducer 66 is electronically communicable with the second ECU 20. It will be appreciated that the third and fourth transducers 64, 66 may be replaced by a single transducer, but that providing a pair of transducers 64, 66 provides redundancy, and improved failsafe capability.

A fifth transducer 68 and a sixth transducer 70 may be provided to monitor pressure in the delivery line 24. The fifth transducer 68 may be electronically communicable with the second ECU 20 and the sixth transducer may be electronically communicable with the first ECU 18. The fifth and sixth transducers 68, 70 could be replaced by a single transducer, but the provision of a pair of delivery transducers 68, 70 provides redundancy and improved failsafe capability.

In use, the vehicle braking system 10 is used to actuate one or more brakes (not shown) by controlling the flow of fluid through the modulator valve 50. As mentioned above, the modulator valve 50 is a three-position valve, and each position or configuration of the modulator valve 50 provides for a different 'state' of the vehicle braking system 10. In a first, 'build' position, the modulator valve 50 delivers pressurised fluid to the or each brake via the delivery port 50b. In a second, 'exhaust' condition, the modulator valve vents fluid to the exhaust 26 via the exhaust port 50c, and in a third 'hold' condition, the flow of fluid through the modulator valve 50 is prevented. Actuation of the modulator valve 50 is effected by the supply of pressurised fluid from the second control valve 56 or one of the control lines 28, 30. The default condition is for the actuation of the modulator valve 50 to be effected by the supply of pressurised fluid from the second control valve 56.

Pressurised fluid may be supplied to the second control valve 56 from the source of pressurised fluid via the primary valve assembly 32 or the secondary valve assembly 42. This provides for redundancy in the braking system 10, and enables the brakes to be applied in the event of electrical or pneumatic failure in one of the first and second ECUs 18, 20 and/or the associated communication paths, and/or in one of valves 34, 36, 44, 46 and/or fluid flow lines which supply pressurised fluid to/from any or all of the valves 34, 36, 44, 46, i.e. upstream of the control valve assembly 52.

In order for pressure to build in the braking system 10, at least one of the build valves 34, 44 must be opened. Each build valve 34, 44 may be biased towards a closed configuration. The associated ECU 18, 20 is operable to provide a signal to the respective build valve 34, 44 to open.

To dump pressurised fluid from the primary or secondary valve assembly 32, 42, the respective dump valve 36, 46 (which may be biased towards a closed position) is provided with a signal from the respective ECU 18, 20, to open. This provides fluid communication between the source of pressurised fluid and atmosphere or a low pressure area, via an outlet of the respective dump valve 36, 46, which is in fluid communication with an outlet of the respective build valve 34, 44.

When the first build valve 34 is open, fluid communication is possible between the outlet 34b of the first build valve 34 and the first inlet of the first control valve. In order for the primary valve assembly 32 to provide a fluid flow path to the modulator valve 50, the first control valve 54 must be in a first position, in which fluid communication between the first inlet 54a and the outlet 54c of the first control valve is enabled. In this first position of the first control valve 54, fluid communication between the second inlet 54b and the outlet 54c of the first control valve 54 is prevented. The outlet 54c of the first control valve 54 is fluidly communicable with the first inlet 56a of the second control valve, when the second control valve 56 is in a first position. The first position of the second control valve 56 enables fluid flow between the first input 56a and the outlet 56c of the second control valve, to enable control of the modulator valve 50.

The first transducer 60 is operable to provide an indication of whether the respective build valve 34, is operating as expected and/or as required. In the event of a failure in the primary build valve 34 and/or the fluid flow path between the source of pressurised fluid and the build valve 34, the first transducer 60 may provide an indication to the first ECU 18 that the pressure in the fluid flow path between the source of pressurised fluid and the primary build valve 34 is not as expected. In this event, the first ECU 18 provides an indication to one or both of the other ECUs 20, 22, to indicate that the secondary build valve 44 should be opened. The second ECU 20 may provide a signal to the secondary build valve 44 to open, and the third ECU provides a signal to place the first control valve 54 in a second position. The third ECU 22 may control the position of the first control valve 54 and the second control valve 56. In the event of a failure of the first ECU 18, one or both of the second and third ECUs may detect such a failure, and enable the secondary valve assembly 42, and place the first control valve 54 in its second position.

When the secondary build valve 44 is open, fluid communication is possible between the outlet 44b of the second build valve 44 and the second inlet 54b of the first control valve 54. In order for the secondary valve assembly 42 to provide a fluid flow path to the modulator valve 50, the first control valve 54 must be in its second position, in which fluid communication between the second inlet 54b and the outlet 54c of the first control valve 54 is enabled. In this second position of the first control valve 54, fluid communication between the first inlet 54a and the outlet 54c of the first control valve 54 is prevented. The outlet 54c of the first control valve 54 is fluidly communicable with the first inlet 56a of the second control valve 56. The first position of the second control valve 56 enables fluid flow between the first inlet 56a and the outlet 56c of the second control valve 56, to enable control of the modulator valve 50.

In the event of a failure in the secondary valve assembly 42 and/or the second ECU 20, the primary valve assembly 32 may be operable, and the first control valve placed in its first position.

The primary valve assembly 32 and the secondary valve assembly 42 may routinely be operated alternately, which can assist in identifying faults which may otherwise remain latent. This method of operation is optional, and one of the primary valve assembly 32 and the secondary valve assembly 42 may be operated as the principal valve assembly unless and until a fault causes the operation of the other of the primary valve assembly 32 and the second valve assembly 42.

In the event that the first and second transducers 60, 62 indicate that neither the first control assembly 32 nor the second control assembly 42 is being supplied with pressurised fluid, then the first and second ECUs 18, 20 may communicate a failure to the third ECU 22. In the event that one or both of the first and second ECUs 18, 20 has failed, then this may be indicated to the third ECU 22, in any event (for example by means of a failed communication between the third ECU 22 and the or each failed one of the first and second ECUs 18, 20).

A failure of both the primary and secondary circuits or upstream of the second control valve 56, causes the third ECU to place the second control valve in its second condition, to enable fluid communication between the second inlet 56b and the outlet 56c of the second control valve, and hence fluid communication between the control line 28, 30 and the modulator valve 50.

The fifth and sixth transducers 68, 70 monitor the pressure in the delivery line 24. In the event of a loss of pressure, for example, when a braking demand is being made, each of the transducers 68, 70 is operable to indicate this event to its respective one of the ECUs 18, 20, and for remedial action to be taken if necessary or desirable. In the event that one of the fifth and sixth transducers 68, 70 fails, the respective ECU 18, 20 is able to communicate this to one or both of the other ECUs 18, 20, 22 such that the configuration of the braking system 10 may be altered if necessary or desirable.

In the event of loss of all electronic communication, the modulator valve 50 is supplied with pressurised fluid via one of the control lines 28, 30. Each of the third and fourth transducers 64, 66 provides an indication of the pressure in the fluid flow path between the control line 28, 30 and the second control valve 56 to its respective one of the first and second ECUs 18, 20. In the event of failure of one of the third and fourth transducers 64, 66, the respective ECU 18, 20 is able to indicate this failure to at least one of the other ECUs 18, 20, 22, such that the configuration of the braking system 10 may be altered, if necessary or desirable.

The arrangement of the valves and ECUs of the vehicle braking system 10 provides for enhanced redundancy and improved failsafe capability. The braking system 10 has primary and secondary supply circuits, which includes redundancy in both the pneumatic and electronic components of each circuit, including the ECUs 18, 20. The braking system also provides for loss of all electronic communication, through the provision of a fluid actuated modulator, such that all of the components in the system which require an electrical signal or input may be circumvented, to effectively provide a pneumatic override. There are also redundant transducers 64, 66, 68, 70, to improve the failsafe capability, by providing back-up signals which can be acted upon by the respective ECUs 18, 20.

It will be understood that the first, second and third ECUs 18, 20, 22 may be arranged physically separately from one another, or as elements or components of a single ECU. In other words, the physical ECU of a vehicle braking system may have a separate circuit board for each of the first, second and third circuit boards 18, 20, 22, or there may even be a single circuit board, with three independent circuit elements which are communicable with one another as described herein and/or as shown in the accompanying drawing, but which are sufficiently isolated from one another to be able to provide the redundancy features described herein and/or as shown in the accompanying drawing.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An electro-pneumatic vehicle braking system including a control line, a modulator valve for controlling a supply of pressurized fluid to at least one brake actuator, a primary valve assembly and a secondary valve assembly, the primary valve assembly and the secondary valve assembly each being fluidly communicable with a source of pressurized fluid, and each of the primary and secondary valve assemblies being fluidly communicable with a control valve assembly, the control valve assembly being configurable in a first configuration to enable fluid communication between the primary valve assembly and the modulator valve, to provide a pneumatic control signal to the modulator valve, in a second configuration to enable fluid communication between the secondary valve assembly and the modulator valve, to provide a pneumatic control signal to the modulator valve, and in a third configuration in which fluid communication between either of the primary and secondary valve assemblies and the modulator valve is prevented and fluid communication between the control line and the modulator valve is enabled, to provide a pneumatic control signal to the modulator valve.

2. An electro-pneumatic vehicle braking system according to claim 1 wherein the primary valve assembly has an associated first electronic control unit and the secondary valve assembly has an associated second electronic control unit.

3. An electro-pneumatic vehicle braking system according to claim 2 which includes a third electronic control unit.

4. An electro-pneumatic vehicle braking system according to claim 3 wherein the third electronic control unit is operable to control the control valve assembly.

5. An electro-pneumatic vehicle braking system according to claim 2 including a first transducer and a second transducer, each of which is operable to monitor pressure in a fluid flow path between the source of pressurized fluid and a respective one of the primary valve assembly and the secondary valve assembly, wherein the first transducer is electronically communicable with the first electronic control unit and the second transducer is electronically communicable with the second electronic control unit.

6. An electro-pneumatic vehicle braking system according to claim 2 including a pair of transducers which are operable to monitor pressure in a fluid flow path between the control line and the control valve assembly, wherein one of the pair of transducers is electronically communicable with the first electronic control unit and the other of the pair of transducers is electronically communicable with the second electronic control unit.

7. An electro-pneumatic vehicle braking system according to claim 2 including a pair of delivery transducers, each of which is operable to monitor pressure in a delivery line between the modulator valve and the at least one brake actuator, one of the pair of delivery transducers being electronically communicable with the first electronic control unit and the other of the delivery transducers being electronically communicable with the second electronic control unit.

8. An electro-pneumatic vehicle braking system according to claim 1 including a first supply line and a second supply line, each of which is separately fluidly communicable with the source of pressurized fluid.

9. An electro-pneumatic vehicle braking system according to claim 1 including a first control line and a second control line, each of which is separately fluidly communicable with the control valve assembly.

10. An electro-pneumatic vehicle braking system according to claim 1 wherein a failure of either of the primary valve assembly or the secondary valve assembly enables operation of the other of the primary valve assembly or the secondary valve assembly.

11. An electro-pneumatic vehicle braking system according to claim 1 wherein in the event of a total electronic failure, the control valve assembly is configurable to provide pneumatic control of the braking system, including the modulator valve, by placing the control valve assembly in the third configuration.

* * * * *